United States Patent [19]

Burkes, Jr. et al.

[11] 4,442,669

[45] Apr. 17, 1984

[54] NOZZLE/VALVE DEVICE FOR A DUCTED ROCKET MOTOR

[75] Inventors: William M. Burkes, Jr.; William H. Miller, both of McGregor, Tex.

[73] Assignee: Hercules Incorporated, Wilmington, Del.

[21] Appl. No.: 233,724

[22] Filed: Feb. 12, 1981

[51] Int. Cl.³ ............................ F02K 9/72; F02K 9/80
[52] U.S. Cl. ...................... 60/251; 251/138; 251/228; 137/375; 138/46
[58] Field of Search ................. 60/245, 253, 270 R, 60/270 S, 271, 251; 137/625.18, 375; 251/138, 228, 298; 138/45, 46

[56] References Cited

U.S. PATENT DOCUMENTS

| | | | |
|---|---|---|---|
| 2,833,511 | 5/1958 | Fletcher | 251/298 |
| 2,968,919 | 1/1961 | Hughes et al. | 60/35.6 |
| 3,192,709 | 7/1965 | Hardy | 60/35.6 |
| 3,347,496 | 10/1967 | Opfer, Jr. | 138/46 |
| 3,760,589 | 9/1973 | Puckett et al. | 60/253 |
| 3,786,993 | 1/1974 | Burgess et al. | 239/265.19 |
| 3,907,222 | 9/1975 | McComas | 244/74 |
| 3,914,935 | 10/1975 | Burkes, Jr. | 60/225 |
| 3,970,253 | 7/1976 | Burkes et al. | 239/265.19 |
| 4,102,498 | 7/1978 | Cherry | 239/265.19 |
| 4,355,663 | 10/1982 | Burkes, Jr. et al. | 60/271 |

*Primary Examiner*—Carlton R. Croyle
*Assistant Examiner*—Jeffrey A. Simenauer
*Attorney, Agent, or Firm*—John E. Crowe

[57] ABSTRACT

A nozzle/valve device for a ducted rocket motor is provided. The nozzle/valve device employs a design in which a nozzle throat blockage element can be moved by rotational motion into and out of the nozzle throat section of the device. The blockage element is designed so that in the closed position the nozzle throat has a minimum cross-sectional flow area and therefore the nozzle throat is never fully closed. The seals employed in the nozzle/valve device are isolated from contact with reaction products of the gas generator and effective use of minimum amounts of erosion resistant materials is achieved.

7 Claims, 3 Drawing Figures

4,442,669

NOZZLE/VALVE DEVICE FOR A DUCTED ROCKET MOTOR

SUMMARY OF THE INVENTION

This invention relates to a nozzle/valve comprising a throat area change device employing a side insertable/retractable rotatable blockage body designed for forming a variable choke area in a nozzle throat which provides a flow channel between a fuel rich solid propellant gas generator and a secondary combustion chamber in a ducted rocket motor.

BACKGROUND OF THE INVENTION

Fixed-fuel-flow ducted rockets suffer performance degradation when operated at altitudes and fuel-grain soak temperatures substantially different from baseline design conditions. System performance studies for ducted rockets indicate significant improvements are possible if fuel-rich generant flow rate can be controlled so as to approach a near-optimum air-to-fuel ratio for each particular flight and environmental condition.

OBJECTS OF THE INVENTION

It is an object of the present invention to provide a nozzle/valve for a ducted rocket motor which will enable significant improvement in system performance.

The other objects, features, and advantages of the present invention are pointed out with particularity in the claims annexed to this specification. Further, they will become more apparent in light of the following detailed description of the preferred embodiment thereof and as illustrated in the accompanying drawings.

In accordance with the present invention, a nozzle/valve provides a variable choke area in the nozzle through which fuel-rich generant from a solid propellant gas generator flows into a secondary combustion chamber of a ducted rocket. The nozzle/valve is movable from a fully open position to a closed position. In the closed position the choke area of the nozzle is reduced to a predetermined minimum area but the nozzle throat is never completely closed. Elimination of total closure of the nozzle throat eliminates one cause of catastrophic over-pressurization of a gas generator in a ducted rocket motor. The unique design of the nozzle/valve of this invention permits use of erosion resistant and thermal shock resistant materials at locations which enable minimum quantities of such materials to be effective. The nozzle/valve of this invention employs seals which are removed a substantial distance from the hot flowing gas passing through the nozzle/valve such that the seals remain effective during the life of the unit.

In the preferred embodiment, there is provided a nozzle/valve for controlling the flow of combustion products from a fuel generator to a secondary combustion chamber of a ducted rocket motor, said nozzle/valve comprising a valve body having a flow section comprising an outer flow member and a flow insulator for said outer flow member housed within and extending throughout the length of the outer flow member, said flow insulator having side walls and a central longitudinal cavity in said flow insulator defining a flow channel through said flow section, and a second cavity extending through the side wall of said flow insulator and said outer flow member, a blockage body housing section directly external to said second cavity and in direct communication with said flow section, said blockage body housing section comprising an outer housing member defining a housing enclosure, and a housing insulator within said housing enclosure and contiguous to the inner surface of said housing member for all of said inner surface, the interior periphery of said housing insulator defining an internal cavity communicating with the second cavity of the flow section, a rotatable blockage body element accommodated by the internal cavity defined by the housing insulator, which rotatable blockage body element may be rotated on an axis perpendicular to but displaced from the centerline of the flow channel such that a first portion of the rotatable blockage body element may form a flow blockage element for the flow channel, a housing closure element in locking engagement with said blockage body housing section, said housing closure element having an opening therethrough, actuator means extending through the opening in the housing closure element, said actuator means capable of imparting rotational movement to the rotatable blockage body element to rotate said blockage body element between a closed position in which said blockage body element partially blocks the flow channel and an open position in which said blockage body element is removed from the flow channel, first seal means for sealing between the housing closure element and the blockage body housing section, and second seal means for sealing between the housing closure element and the actuator means.

BRIEF DESCRIPTION OF THE DRAWINGS

In FIG. 1 a dual manifold system employing twin nozzle/valves of this invention is illustrated although any number of single or multiple nozzle/valves of this invention may be used in a particular environment. Each nozzle/valve (10) comprises a valve body (12) having a blockage body housing section (14) and a flow section (16). Flow section (16) is a tubular member which is in communication with the blockage body housing section (14) at some point along its length. The flow section (16) has opposing flow ports (18), (20) in FIG. 1, either of which may be the inlet or the outlet for gas flow, depending on the orientation of the nozzle/- valve (10) in the gas flow path in which the valve is mounted.

Figure 1:
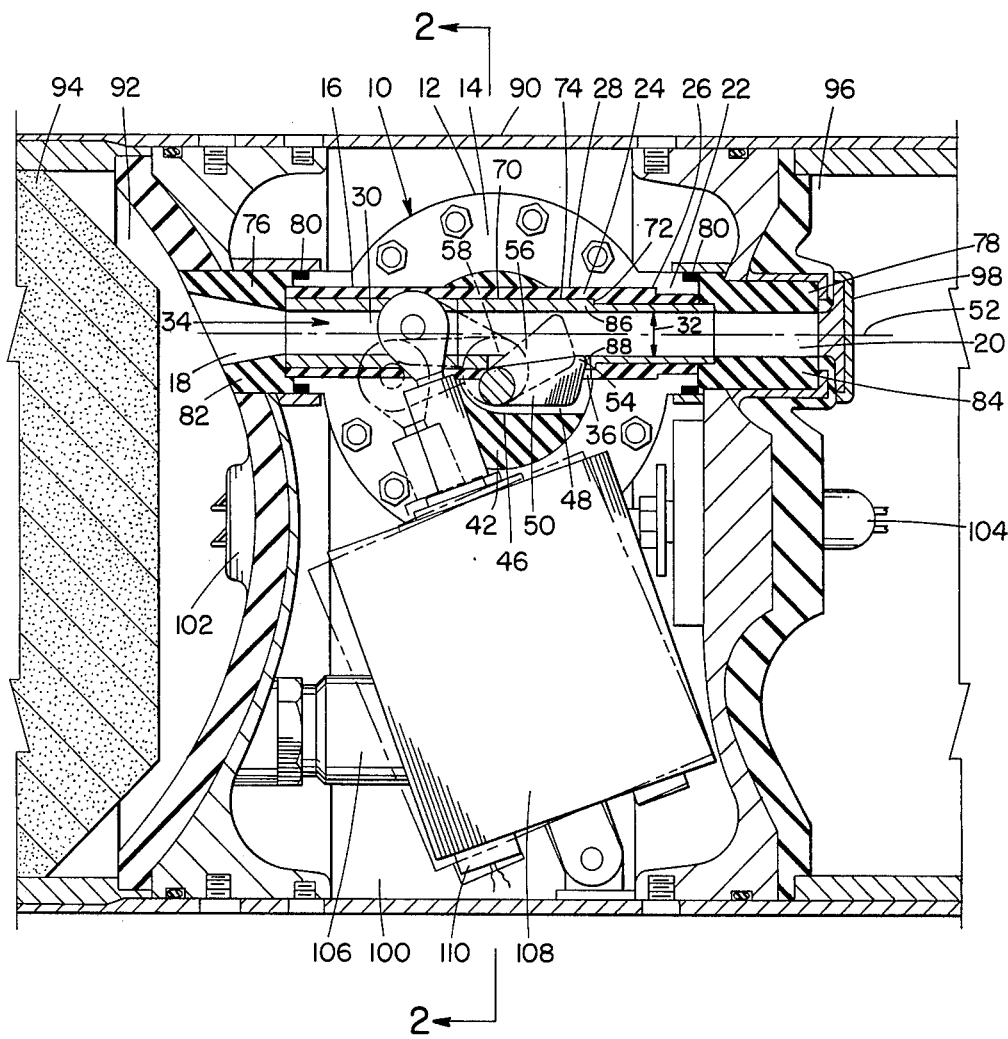
FIG. 1 is a side view of a ducted rocket partially broken away and partially in cross-section illustrating the position of the nozzle/valve of this invention with respect to the forward end of the ducted rocket containing the fuel-rich solid propellant grain and the aft end of the ducted rocket containing the secondary combustion chamber which can also be used as a booster propellant rocket chamber.

Still with reference to FIG. 1, the flow section (16) comprises a tubular outer flow member (22) containing a tubular flow insulator (24) which is contiguous with the inner surface (26) of the outer flow member (22). The side wall (28) of the flow insulator (24) defines a central longitudinal cavity (30) of circular cross-section (32), extending throughout the length of the flow insulator (24). This central longitudinal cavity (30) formed by the tubular side wall (28) of the flow insulator (24) defines a flow channel (34) through flow section (16). This may be seen more clearly in FIG. 2. Flow insulator (24) also has a second cavity (36) extending through the side wall (28) of said flow insulator (24) and the outer flow member (22). This second cavity (36) is located at an angle to and intersecting the flow channel (34).

Figure 2:
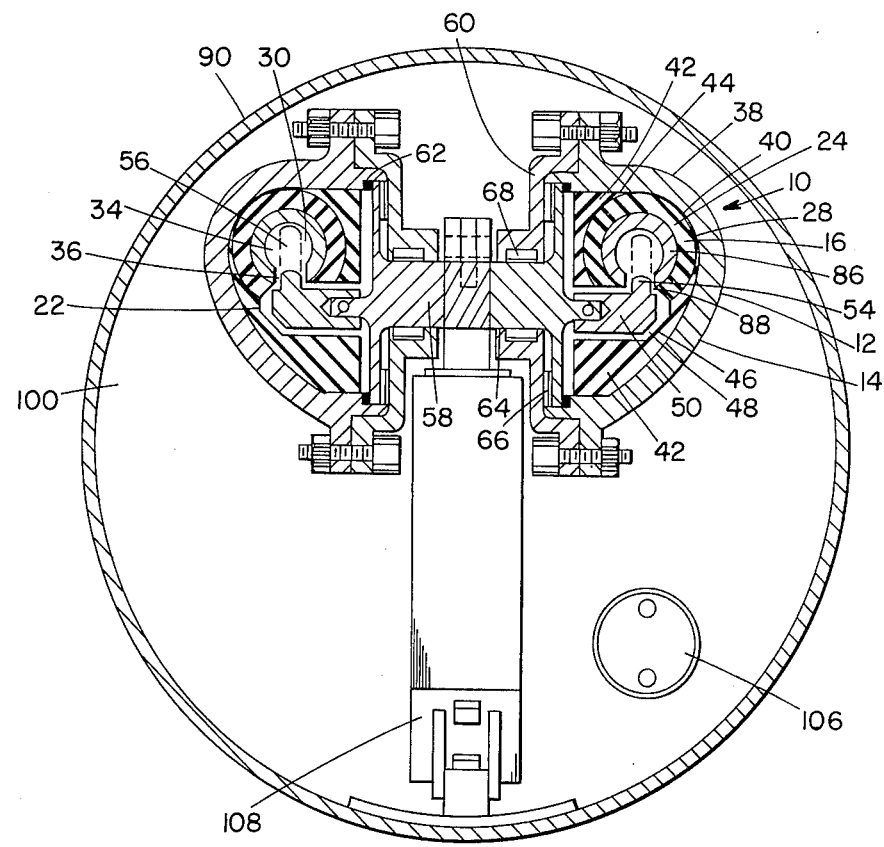
FIG. 2 is a front view in cross-section of a dual manifold system employing two of the nozzle/valves of this invention.

With reference to FIG. 2, blockage body housing section (14) is contiguous to and positioned along the length of flow section (16) so as to communicate directly with the second cavity (36) in the outer flow member (22). Blockage body housing section (14) comprises an outer housing member (38) of some suitable geometry so as to define a housing enclosure (40). The interior of this housing enclosure (40) contains a housing insulator (42) contiguous to the inner surface (44) of the outer housing member (38). The interior periphery (46) of the housing insulator (42) in turn defines an internal cavity (48) of a geometry so as to accommodate a rotatable blockage body element (50). The internal cavity (48) formed by the geometry of the interior periphery (46) of the housing insulator (42) is in direct registration with the second cavity (36) through the side wall (28) of the flow insulator (24) and the outer flow member (22). A blockage body element (50) is rotatably mounted within the internal cavity (48). The blockage body element (50) may be rotated on axis which is perpendicular to but displaced from the centerline (52) of the flow channel (34) as seen in FIG. 1. In this manner, a first portion (54) of the rotatable blockage body element (50) may be rotated through the second cavity (36) into flow channel (34) and form a flow blockage element, shown in phantom as (56) in each figure, in the flow channel (34). The blockage body element (50) is rotated by eccentrically rotatably pivoted actuator means (58) through secured linkage drown in phantom, more fully described hereinafter. When the blockage body element (50) is rotated into the position shown in phantom as (56) in FIG. 2, the nozzle/valve (10) of the present invention is said to be in its closed position. When the blockage body element (50) is rotated back out of the flow channel (34), the nozzle/valve (10) of the present invention is said to be in its open position.

Blockage body housing section (14) and a housing closure element (60) are secured to each other by some type of closure mechanism, such as flanged sections engaged with multiple bolts as illustrated generally in FIG. 2. The junction between the actuator means (58) and the housing closure element (60) is provided with some type of sealing means, such as a metal C-ring, as is shown as (62) in FIG. 2.

With continued reference to FIG. 2, the housing closure element (60) is provided with an opening (64) to accommodate the actuator means (58). In the embodiment described, a face thrust bearing (66) provides low friction force between the actuator means (58) and the housing closure element (60). It is also advantageous to provide an antifriction bearing for the actuator means (58) and a full complement needle bearing is shown as (68) in FIG. 2. The actuator means (58) is fixedly attached to the rotatable blockage body element (50) such that rotation of the actuator means (58) by an external activation means through actuator (108) and linkage (shown in phantom) will cause rotation of the blockage body element (50).

In the nozzle/valve described in FIG. 1, flow insulator (24) has an axial cylindrical cavity (70) which bridges the intersection of the blockage body section (14) and the flow section (16).

As seen in FIG. 1, the axial cylindrical cavity (70) is defined by annular shoulder (72) and side wall (74). Most advantageously, axial cavity (70) extends from one end of flow insulator (24) at least through the area of the junction of flow section 16 and blockage body housing section (14), and preferably through a substantial portion of the length of flow insulator (24). The nozzle/valve of this invention can be installed in a ducted rocket motor as shown in FIG. 1 in which the nozzle/valve is connected to throat sections (76) and (78) which are secured by some type of clamping means and suitably sealed, as by the use of metal C-rings shown as (80) in FIG. 1. Throat sections (76) and (78) contain insulators (82) and (84) which correspond in circumferential size and shape with flow insulator (24) containing thin cylindrical insert (86). Other means for connecting and sealing of the nozzle/valve of this invention in a ducted rocket motor can be employed.

Still with reference to FIG. 1, cylindrical insert (86) is prepared from an erosion resistant material, preferably titanium-zirconium-molybdenum-alloy, and is sized to correspond in size to axial cylindrical cavity (70) and is placed therein. When the cylindrical insert (86) is thus inserted, the interior surface formed by flow insulator (24) and cylindrical insert (86) is a smooth, substantially continuous surface except for side cavity (88) in cylindrical insert (86). Side cavity (88) extends through the side wall of cylindrical insert (86) and side cavity (88) is in registration and alignment with cavity (36) in flow insulator (24) and the internal cavity (48) formed by the housing insulator (42).

It should be apparent that flow insulator (24) or housing insulator (42) may be formed of one or more pieces so long as any individual pieces fit together to form a substantially continuous insulating surface.

FIG. 1 further illustrates the position of the nozzle/valve (10) of the present invention housed in a ducted rocket motor (90) in relation to the forward chamber (92), the fuel-rich gas generator charge (94) housed within a forward chamber (92) within the ducted rocket motor (90) and the secondary combustion chamber (96) at the aft-end of the ducted rocket motor (90). Flow channel (34) connects the forward chamber (92) with the combustion chamber (96). A blow-out plug (98) is used to close flow channel (34) to prevent combustion gases from passing from secondary combustion chamber (96) through flow channel (34) into forward chamber (92). Combustion gases result upon ignition of solid propellant (not shown) which forms the boost stage of the ducted rocket motor (90) and which, upon completion of burning, leaves a cavity which becomes the secondary combustion chamber (96). Flow of such gases through flow channel (34) could ignite the fuel-rich gas generator charge (94) out of proper sequence, in operation of a ducted rocket motor (90). However, in some applications, this initial ignition of the fuel-rich gas generator charge (94) is acceptable.

FIG. 1 shows the interstage (100) between the forward chamber (92) and the secondary combustion chamber (96) of the ducted rocket motor (90). In addition to the nozzle/valve (10) of the present invention, several other components are advantageously housed within the interstage (100) of the ducted rocket motor (90). These components may include a safe/arm-igniter device (104) for the booster propellant (not shown), a safe/arm-igniter device (102) for the fuel-rich gas generator charge (94), a pressure transducer (106) for measuring pressure within forward chamber (92), an actuator device (108) for rotating actuator means (58) via conventional linkage, and a linear potentiometer (110) for measuring movement of the external actuator device (108).

In a dual manifold system, as illustrated in FIG. 2, the actuator device (108) is positioned between each nozzle/valve (10), such that the actuator device (108) may simultaneously rotate the actuator means (58) in each nozzle/valve (10). The actuator device (108) operates in response to an electrical signal as follows. Upon receipt of a signal generated in response to action of the ducted rocket missile, the rotatable blockage body element (50) is rotated in response to the signal, dependent upon how the missile is programmed or commanded to function. Movement of the first portion (54) of the rotatable blockage body element (50) out of the flow channel (34) removes the flow blockage element (56) from the cross-sectional area of the flow channel (34). Also, in response to a signal, the flow blockage element (56) can be rotated into the flow channel (34), reducing the flow area through the nozzle/valve.

Figure 3:
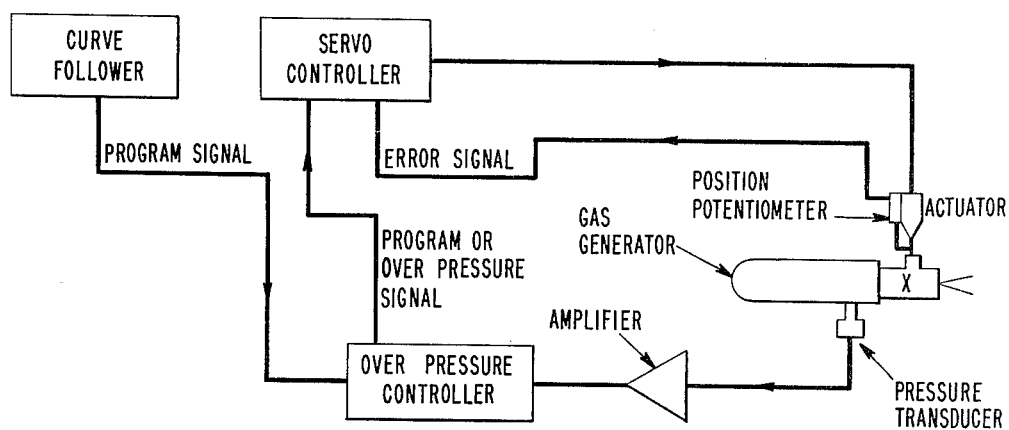
FIG. 3 is a diagram of a pre-programmed control loop used for controlling the opening and closing of the nozzle/valve of this invention according to a pre-programmed schedule. DETAILED DESCRIPTION OF THE PREFERRED EMBODIMENT This application is related to our co-pending U.S. Pat. application Ser. No. 129,284 filed March 11, 1980 now U.S. Pat. No. 4,355,663. The nozzle/valve of the present invention is intended for use in similar environments as the nozzle/valve disclosed therein. The disclosure of that application, particularly with respect to alternative environments are hereby incorporated by reference.

FIG. 3 illustrates a typical control loop for preprogramming the operation of a nozzle/valve of the present invention. As illustrated, a pressure transducer (106) senses the pressure in the forward chamber (92) and sends an electrical signal based on the pressure sensed to an amplifier. The amplified signal is transmitted to a pressure controller wherein the pressure is compared with a signal emitted by a curve follower which is preprogrammed and which is activated on firing of the ducted rocket motor (90). If the electrical signals received by the controller are different, the pressure controller emits a signal to the sensor controller which in turn actuates the actuator device to open or close the nozzle/valve (10) as necessary to bring the pressure in the forward chamber (92) into agreement with the preprogrammed pressure. Control systems other than the system described above can be employed in the operation of the nozzle/valve (10) of the present invention.

The nozzle/valve of this invention provides a fully variable, multicycle, reversible nozzle in which the nozzle throat area can be varied. The nozzle/valve can be actuated by any suitable means such as electromechanical, pneumatic or hydraulic actuators with feedback control. The nozzle/valve of this invention can be housed in a ducted rocket motor within a forward gas generator chamber, within the secondary combustion chamber or in an interstage between said chambers which has been illustrated in the drawings. The interstage installation is the preferred position for installation of the nozzle/valve of this invention to provide isolation of the nozzle/valve components from the combustion environment of the ducted rocket.

The nozzle/valve of this invention employs rotational motion of the rotatable blockage body element to control gas flow. The design of the nozzle/valve of this invention enables isolation of seals, bearings and the actuation device from direct contact with hot combustion gases and provides a design enabling minimum quantities of erosion resistant materials to be employed effectively at critical points within the nozzle/valve. Isolation and thermal protection of many components achieved by the nozzle/valve of this invention results in improved and reproducible performance for a controllable variable fuel flow ducted rocket motor.

Choice of materials is important in construction of the nozzle/valve of this invention. The throat blockage element described herein as the first portion (54) of the rotatable blockage body element (50) and the cylindrical insert (86) which defines, in part, the flow channel (34) for hot fuelrich products flowing from the forward gas generator chamber (92) to the secondary combustion chamber (96) must be erosion resistant and have high temperature strength and low thermal expansion. Materials found preferable for use as throat blockage elements at temperature/pressure environments of about 2000° F. and 2000 p.s.i. were an alloy of titanium, zirconium and molybdenum (TZM), a tungsten-rhenium alloy (W-25RE) and a tantalum-tungsten alloy (TA-10W).

The flow insulator (24) and housing insulator (42) employed in the nozzle/valve (10) of this invention are preferably prepared from silica-phenolic materials. High pressure molded silica-phenolic materials are available commercially from Fiberite Corporation, Winona, Minnesota. A particularly suitable silica-phenolic insulator is prepared from MX 2646 molding compound by Fiberite Corporation. Carbon-phenolic molded insulators can also be employed. Carbon-phenolic insulators are also available from Fiberite Corporation.

Of the various types of devices that can be employed as the actuator devices (108) for the nozzle/valve (10) of this invention, electromechanical devices are preferred. Suitable devices are available commercially from Avionic Products Company, Denville, New Jersey; Plessey Dynamics Division, Hillside, New Jersey; and Motion Controls Division, Cedar Knolls, New Jersey.

Seals which can be employed in the nozzle/valve of this invention must be selected from materials suitable for use under the temperature conditions encountered in operation of the ducted rocket motor (90) in which the nozzle/valve (10) of this invention is employed. Elastomeric O-rings can be employed in isolated points, such as the junction seals (80), and these may be made from materials such as ethylene-propylene terpolymer or silicone rubber. However, it is advantageous that all seals subjected to high temperature/pressure environments be prepared from solid copper gaskets, copper crush gaskets or metal C-rings made from materials such as Inconal X-750 preferably with silver or nickel plating. Such seals are available commercially from UAP Components, Inc.

What we claim and desire to protect by Letters Patent is:

1. A nozzle/valve for controlling the flow of combustion products from a fuel generator to a secondary combustion chamber of a ducted rocket motor, said nozzle/valve comprising:
   a valve body having
      a flow section comprising an outer flow member and a flow insulator for said outer flow member, housed within and extending throughout the length of the outer flow member, said flow insulator having side walls and a central longitudinal cavity defining a flow channel through said flow section, and a second cavity extending through the side wall of said flow insulator and said outer flow member, a blockage body housing section directly external to said second cavity and in direct communication with said flow section, said blockage body housing section comprising an outer housing member defining a housing enclosure, and a housing insulator within said housing enclosure and contiguous to the inner surface of said housing member of all of said inner surface, the interior periphery of said housing insulator defining an internal cavity communicating with the second cavity of the flow section, a blockage body element endwise mounted within the internal cavity defined by said housing insulator, a section of said blockage body element being rotatable into and out of the flow channel of said flow section as desired to control the flow of combustion products from said fuel generator, means for imparting movement to said blockage body element, comprising a spool-shaped actuator means eccentrically rotatably mounted with its long axis perpendicular to but displaced from the centerline of said flow channel and endwise secured to said blockage body element, said actuator means being linked at a point intermediate its axial ends to a separately mounted actuator device through linking means; and sensor controller means for activating said actuator device;

whereby rotation is imparted to said actuator means and endwise secured blockage element, to move said blockage body element between a closed position in which said blockage body element partially blocks the flow channel, and an open position in which said blockage body element is removed from the flow channel.

2. A nozzle/valve for controlling the flow of combustion products from a fuel generator to a secondary combustion chamber of a ducted rocket motor, said nozzle/valve comprising:

a valve body having a flow section comprising an outer flow member and a flow insulator for said outer flow member housed within and extending throughout the length of the outer flow member, said flow insulator having side walls and a central longitudinal cavity in said flow insulator defining a flow channel through said flow section, and a second cavity extending through the side wall of said flow insulator and said outer flow member, a blockage body housing section directly external to said second cavity and in direct communication with said flow section, said blockage body housing section comprising an outer housing member defining a housing enclosure, a housing insulator within said housing enclosure and contiguous to the inner surface of said housing member for all of said inner surface, the interior periphery of said housing insulator defining an internal cavity communicating with the second cavity of the flow section, and a housing closure element in locking engagement with said blockage body housing section, said housing closure element having an opening therethrough, a rotatable blockage body element accommodated by the internal cavity defined by the housing insulator, which rotatable blockage body element may be rotated on an axis perpendicular to but displaced from the centerline of the flow channel such that a section of the rotatable blockage body element may form a flow blockage element for the flow channel, actuator means extending through the opening in the housing closure element, said actuator means capable of imparting rotational movement to the rotatable blockage body element to rotate said blockage body element between a closed position in which said blockage body element partially blocks the flow channel and an open position in which said blockage body element is removed from the flow channel, and seal means for sealing between the actuator means and the blockage body housing section.

3. The nozzle/valve of claim 1 or 2 in which the section of the rotatable blockage body element is prepared from titanium-zirconium-molybdenum alloy.

4. The nozzle/valve of claim 1 or 2 in which the housing insulator and the flow insulator are prepared from a silicaphenolic composition.

5. The nozzle/valve of claim 1 or 2 in which the seal means is a metal C-ring.

6. The nozzle/valve of claim 1 or 2 in which a thrust bearing provide low friction force between the actuator means and the housing closure element.

7. The nozzle/valve of claim 1 or 2 in which the flow insulator has an axial cavity in the shape of a thin cylinder extending from about one end of said flow insulator throughout a substantial part of the length of the flow insulator, the interior walls of said axial cavity comprising a part of the interior surface of said flow insulator, and an erosion resistant cylinder having a size and shape conforming to said axial cavity, said erosion resistant cylinder being inserted into and filling said axial cavity, said erosion resistant cylinder having a side wall cavity extending through the side wall of said erosion resistant cylinder, said side wall cavity being in registration with the second cavity in the side wall of the flow insulator.

* * * * *

UNITED STATES PATENT AND TRADEMARK OFFICE
CERTIFICATE OF CORRECTION

PATENT NO. : 4,442,669

DATED : April 17, 1984

INVENTOR(S) : William M. Burkes, Jr. and William H. Miller

It is certified that error appears in the above-identified patent and that said Letters Patent are hereby corrected as shown below:

Col. 3, line 46 " drown " should read -- shown --.

Signed and Sealed this

Twenty-first Day of August 1984

[SEAL]

Attest:

GERALD J. MOSSINGHOFF

Attesting Officer   Commissioner of Patents and Trademarks